Sept. 27, 1932.  A. W. ALTORFER  1,879,004
SERVICE TABLE
Filed Oct. 25, 1930  5 Sheets-Sheet 1
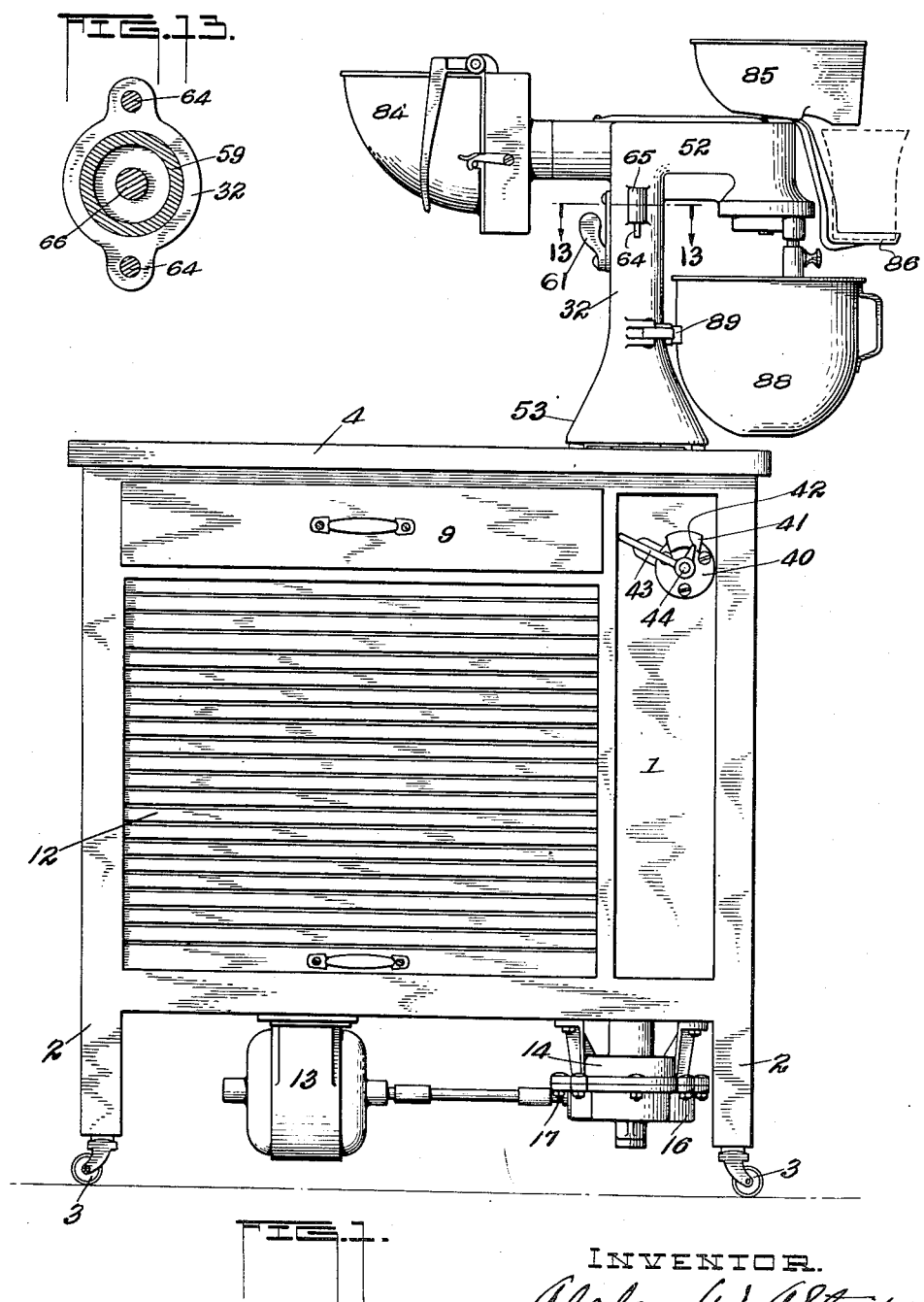

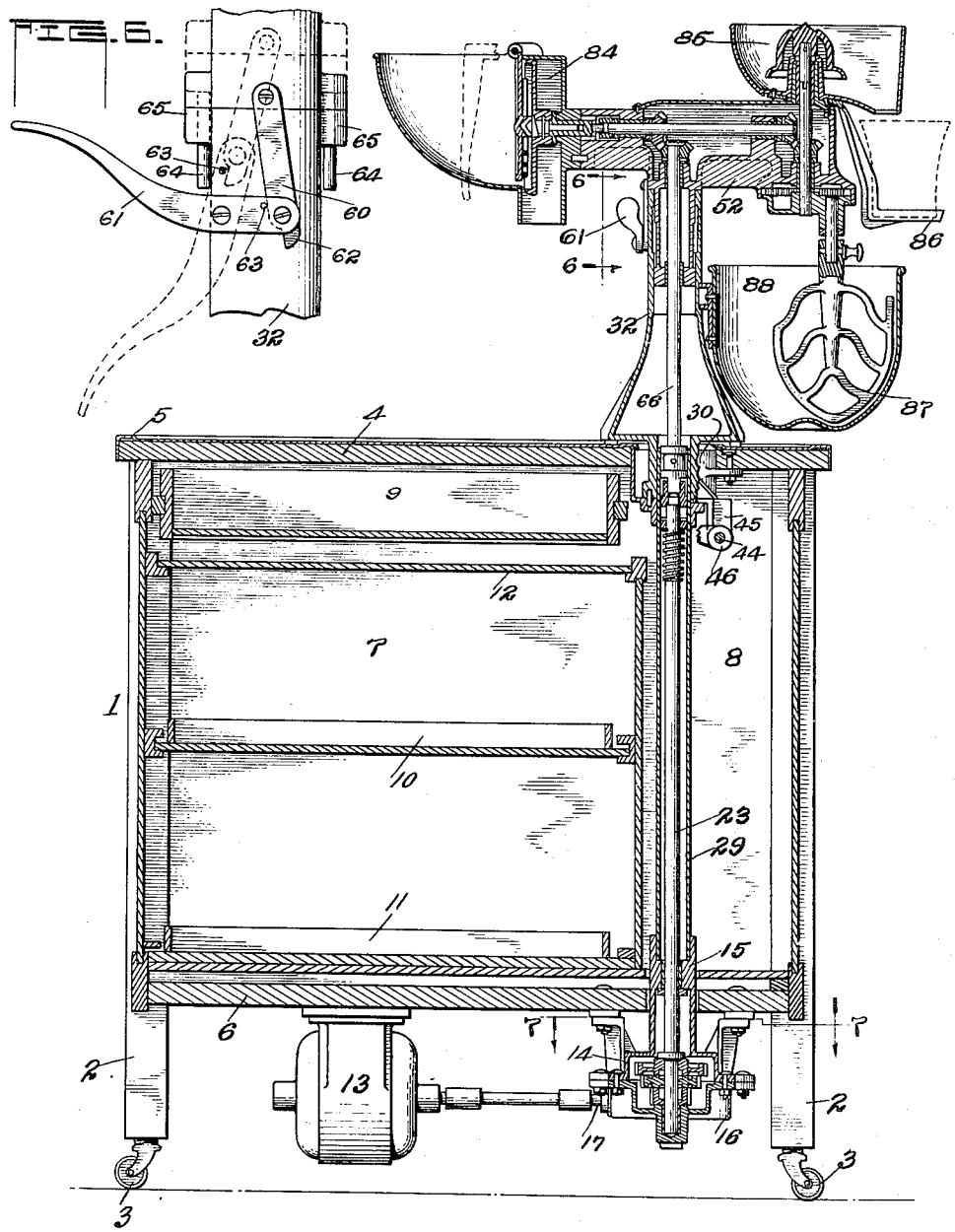

Sept. 27, 1932.   A. W. ALTORFER   1,879,004
SERVICE TABLE
Filed Oct. 25, 1930   5 Sheets-Sheet 3
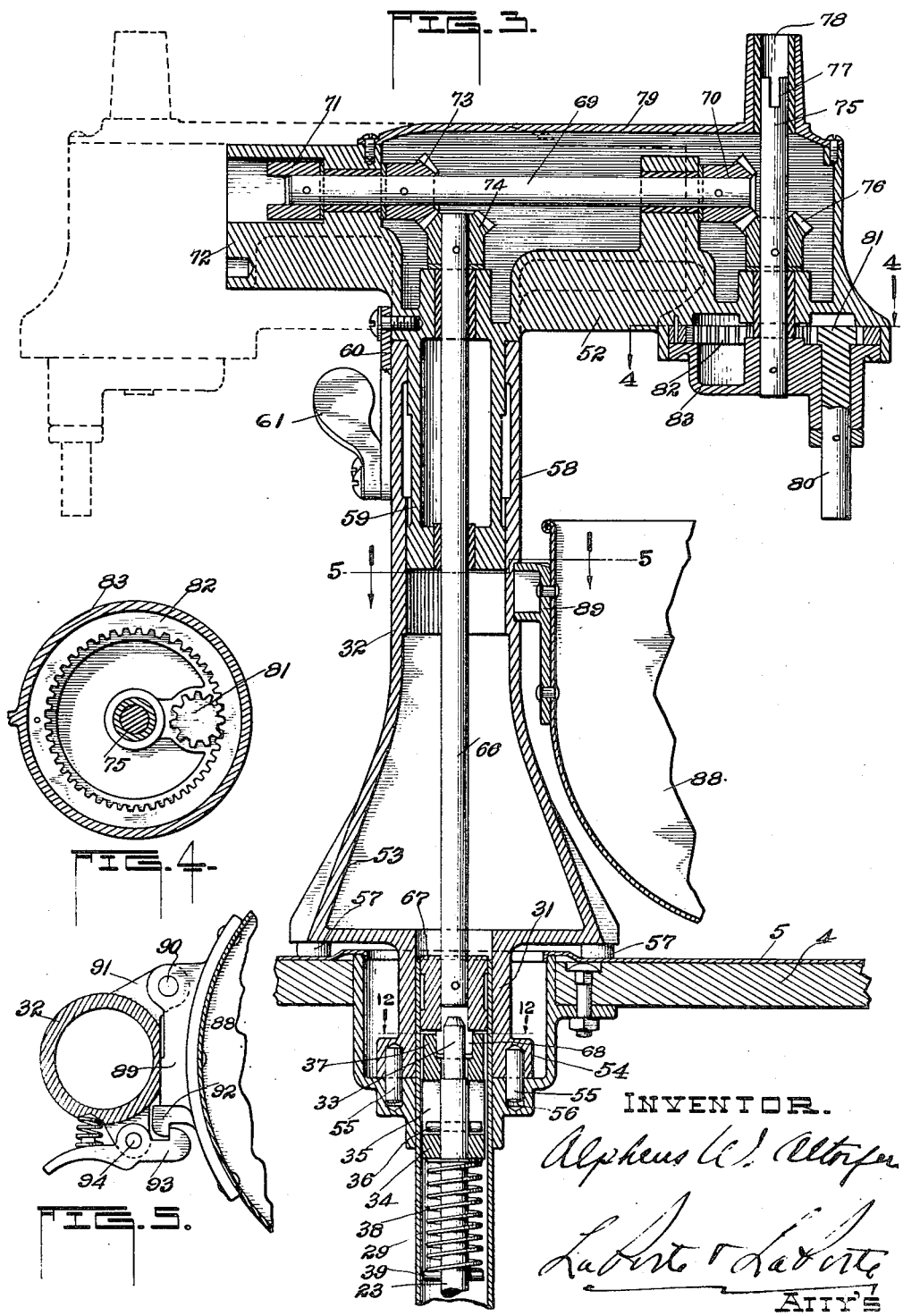

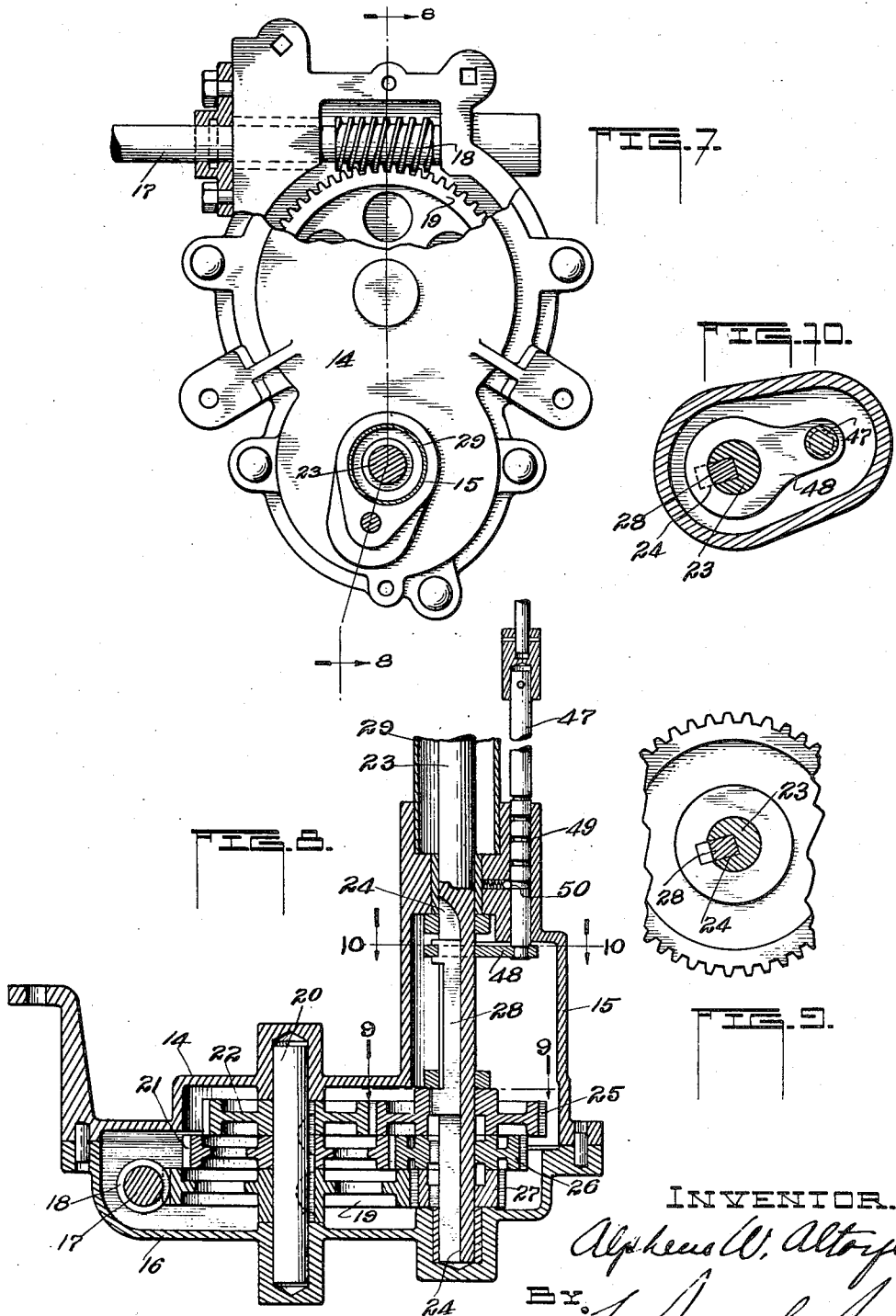

Sept. 27, 1932.  A. W. ALTORFER  1,879,004
SERVICE TABLE
Filed Oct. 25, 1930   5 Sheets-Sheet 5

INVENTOR.
Alpheus W. Altorfer
By LaTorte & LaTorte
ATTYS.

Patented Sept. 27, 1932

1,879,004

UNITED STATES PATENT OFFICE

ALPHEUS W. ALTORFER, OF PEORIA, ILLINOIS

SERVICE TABLE

Application filed October 25, 1930. Serial No. 491,150.

This invention has reference to what I have elected to term a "service table"; and such table has been designed for use in kitchens of homes, restaurants and like places as well as in delicatessens or wherever a device of the present invention may be found useful.

The apparatus of the present invention, in the first place, is of a portable character; in the second place, embodies a power unit operatively connected with a variable speed transmission mechanism, and in the third place, is equipped with an operative means arranged for engageable and disengageable connection with said transmission mechanism; and said operative means includes a series of selective driving connections or power take-off shafts to each of which may be coupled a device having certain peculiar functions in connection with the preparation of foods, fruit juices and the like, as for example, a slicer, juicer, beater, etc. Furthermore, the invention comprehends that the operative means with its driving connections or power take-off shafts is revolubly movable so as to place the driving connections in different positions for a more universal and convenient use with respect to the table, and it further comprehends an adapter in lieu of the operative means, whereby an ironer or some such laundry appliance may be coupled to the table and its transmission mechanism for the purpose of making more variable the use of such a service table.

The invention has for a further object a service table, of the character herein referred to, which is cabinet-like in form; equipped with a drawer, and trays for holding parts or mechanisms used in connection with the table or utensils of one kind and another, and a preferably roller front closure. The transmission being housed in a comparatively shallow housing below the cabinet and the cabinet having an end compartment for housing a propeller shaft leading from the transmission mechanism to the operative means located on the top of the table. So arranging the propeller shaft, in relation to the cabinet proper, completely encases operative parts between the transmission mechanism and the operative means; relieves the cabinet of cumbersome appearance, as would be the case if these parts were carried outside the cabinet, and presents a balanced and more or less uniform appearance throughout, which is desirable for domestic use.

The invention has for a still further object to provide the service table with an operative means and its selective driving connections or power take-off shafts which, in addition to being revolubly movable, is removable from operative connection with the propeller shaft, within the cabinet; whereby, when such mechanism is removed from the table top leaves the top of the table substantially free and unobstructed throughout so that the cabinet may be used as a table in the fullest sense of the term.

Other and further objects will more fully appear from the following description.

That the invention may be more fully understood, reference is had to the accompanying drawings forming part of this description, embodying a preferred form of the invention, in which:—

Fig. 1 is a front elevation of a service table embodying my invention, with the operative means, its driving connections and devices connected therewith in a certain predetermined position in relation to the top of the table;

Fig. 2 is a vertical sectional view taken through the table, of Fig. 1, and showing the drawer, trays, power unit, transmission mechanism, propeller shaft and the operative means and selective driving connections associated therewith;

Fig. 3 is an enlarged vertical sectional view of the upper end of the propeller shaft, the operative means in operative connection therewith and illustrating more in detail a clutch driving connection for controlling the operation of the driving connections associated with the operative means; furthermore, the dotted lines show the operative means in an adjusted position;

Fig. 4 is a sectional detail in plan of an epicycle gear, included in one of the selective driving connections of the operative means and as the same would appear on the line 4—4, Fig. 3;

Fig. 5 is a sectional detail in plan, as the same would appear on the line 5—5, Fig. 3, and illustrates a hinging and coupling means for a bowl-like member adaptable for use in connection with a beater which may be connected to and operated from one of the selective driving connections of the operative means;

Fig. 6 is a detail elevation of a lever means, in full and dotted line position, which is arranged for manual operation when it is desired to cause a clutching or declutching of the power means with the propeller shaft, and is as the same would appear on the line 6—6, Fig. 2;

Fig. 7 is a detail in plan, partly in section and partly broken away of the transmission housing and transmission mechanism, as the same would appear on the line 7—7, Fig. 2;

Fig. 8 is a vertical sectional detail view of the transmission mechanism, propeller shaft and housing, as the same would appear on the line 8—8, Fig. 7;

Fig. 9 is a sectional detail in plan of parts in the transmission mechanism, as the same would appear on the line 9—9, Fig. 8;

Fig. 10 is a sectional detail in plan of elements included in the changeable speed means, as the same would appear on the line 10—10, Fig. 8;

Fig. 13 is a sectional detail, in plan, as the same would appear on the line 13—13, Fig. 1.

Like characters of reference denote corresponding parts throughout the figures.

*The service table and cabinet*

Figure 14:
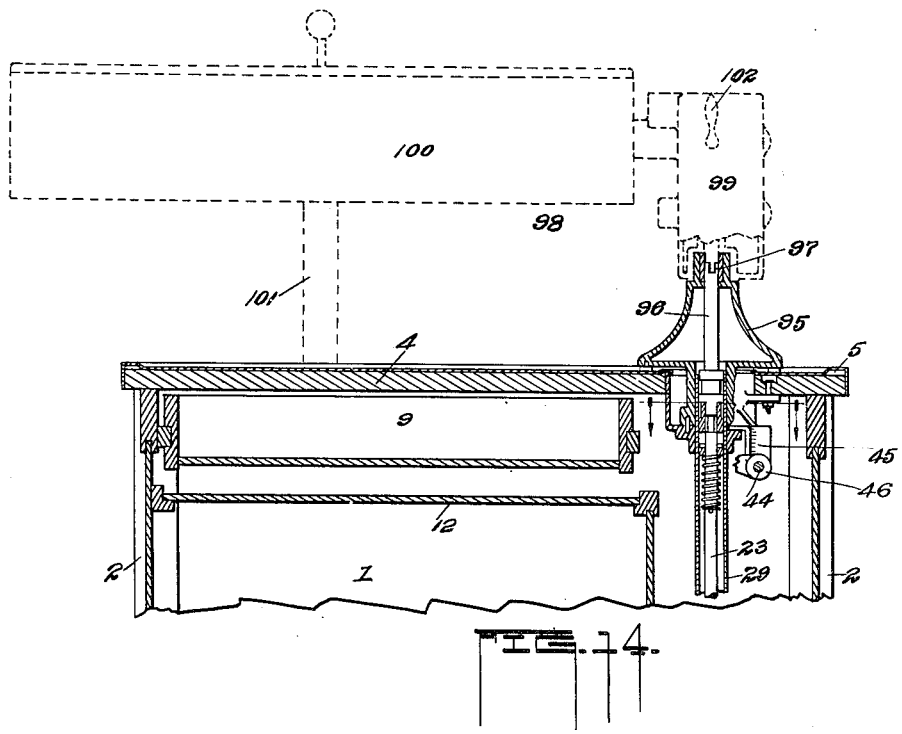
Fig. 14 is an elevation in section of the upper portion of the table and shows the use of an adapter to connect and operate an ironer from the propeller shaft, the ironer being shown in dotted lines.

This table, designated 1, has the form of a cabinet which is supported by legs or standards 2 having caster wheels 3 that it may be moved from one place to another. Such cabinet is enclosed by four walls; has a table top 4 having an opening therethrough and the top covered preferably with sheet metal 5 or other serviceable covering which has an opening coinciding with the opening in the top; has a base portion 6 and is divided into two main compartments, 7 and 8. The former is divided to receive preferably a drawer 9 and with preferably two trays 10 and 11 suitably supported for sliding in and out. The drawer may be used for holding utensils of one kind and another and the trays likewise, although the trays will be found particularly useful for holding operating parts and equipment used on the table. The tray portion of the cabinet has a closure preferably in the form of a roller front 12. The compartment 8, which is near one side of the cabinet contains a propeller shaft, to be described, which connects the transmission mechanism with the operative means on the table. Such an arrangement of cabinet, as pointed out, will provide for housing utensils of one kind and another, as well as operating parts, and eliminates the necessity or undesirableness of locating the propeller shaft in housings on the outside of the cabinet and, therefore, presents a cabinet well balanced, neat in outward appearance and symmetrical in outline.

*The power unit and transmission mechanism*

The elements are supported from and immediately beneath the base 6 of the cabinet.

The power unit is preferably an electric motor 13 suspended at a suitable point from the base 6.

The transmission mechanism is preferably located and arranged within a two part, comparatively shallow housing. Said housing comprises the upper section 14 arranged to be secured to and suspended from the base 6 below the compartment 8 and is formed or provided with an upwardly extended tubular portion 15 which projects up through the base 6 and into the compartment 8. To the section 14 and located therebelow is secured the section 16 and said sections, constituting as they do the housing, have suitable journal bearings to receive shafts for carrying elements of the transmission and the propeller shaft operated therefrom.

The transmission comprises a driving shaft 17 connected preferably in a flexible manner, with the motor 13. The shaft 17 has connected thereto a worm 18 which meshes with and operates a worm wheel 19 keyed to a shaft 20. To the shaft 20 are also keyed, one above the other, spur gear wheels 21 and 22 which have a graduated diameter or pitch in respect of each other and in respect of the gear 19.

Projecting down into the housing, from above and from within the compartment 8, is a propeller shaft 23, the lower end portion of which is formed or provided with a comparatively large key-way 24 and on the lower end of said propeller shaft and within said housing are carried a series of graduated pinions 25, 26 and 27; the smaller of which, being 27, is in mesh with the worm wheel 19; the next larger, being 26, is in mesh with the spur gear wheel 21 and the larger, being 25, is in mesh with the spur gear wheel 22. The teeth on the pinion 27 are cut helical in form to adapt meshing relation with the teeth on the worm wheel 19. These pinions, may be said to be normally loose on the propeller shaft and are each adapted for selective driving connection with the propeller shaft 23 through the medium of a slidable key 28 which is carried and has a slidable movement in the key-way 24 in the propeller shaft. In Fig. 8 this key 28 is shown, in position, connecting the pinion 25 to the propeller shaft whereby to transmit motion from the motor through the shaft 20 and the gear wheel 22 to said propeller shaft. Further downward sliding movement of the key 28 will successively connect either the pinion 26 or the pinion 27 to the propeller shaft to bring about a change of speed of the propeller shaft 23, driving from the shaft 20, in turn operated from the motor 13, in the selective manner provided. Neutral positions of the key 28 are respectively, at points between the pinions 25 and 26 and between the pinions 26 and 27, as will be seen on an examination of Fig. 8, so that at the will of an attendant the speed of rotation of the propeller shaft may be changed or brought to a stand still. The manner of manually controlling the position of the key 28 will be further described.

Extending upwardly from the tubular portion 15 of the housing and throughout the height or length of the compartment 8, is an enclosing and guiding tubing or casing 29 for the propeller shaft 23 which said casing is in alinement with the opening in the table top. The upper end of said tubing or casing 29 is within a chambered bracket member 30 depending through and secured to the under side of the table top 4 and the upper end of said tubing or casing 29, within said bracket, is arranged to have telescoped thereonto and therefrom the lower or neck portion 31 of a power head 32 constituting part of the operative means.

The upper end of the propeller shaft 23 preferably terminates short of the upper end of the tubing or casing 29 and is provided with a preferably pilot end 33. Slidably carried on the upper and pilot end of the propeller shaft 23 is a clutch member 34 having a slotted body 35 to receive a pin 36 passing through the shaft 23 and the upper end of the member 34 is formed or provided with a clutch socket 37 coincident with the pilot end 33 of the propeller shaft. The clutch member 34, at its base, acts against a coil spring 38 which, at its lower end bears against a pin 39 passing through the shaft 23. The slidable movement of the clutch member 34 and the spring cushion therefor, provides for the necessary resiliency to overcome any jar incident to clutching of parts, to be described, with the propeller shaft.

The speed changing shift

Figures 11, 12:
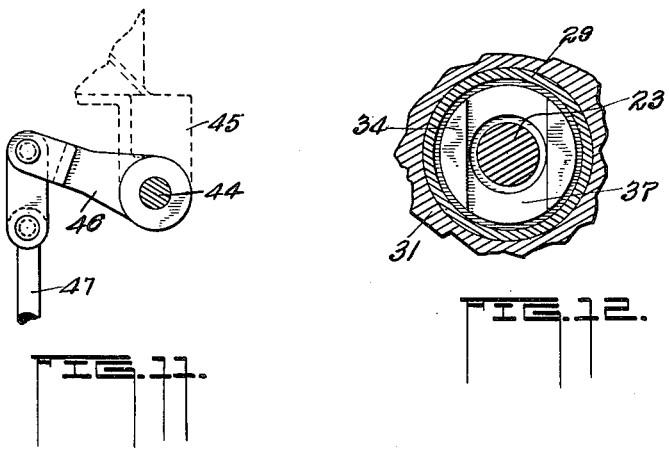
Fig. 11 is a detail view of the means to effect the operation of the changeable speed means of Figs. 8 and 10.
Fig. 12 is a sectional detail, in plan, of clutch parts, as the same would appear in, line 12—12, Fig. 3.

To the front face plate or wall of the compartment 8 and just below the table top 4 is secured a plate 40, see Fig. 1, having a segment 41 on which may appear, although not shown, indicating means, characters or numerals as the case may be, for indicating the position a pointer 42 should assume when moving the key 28 to different speed changing positions. This pointer forms part of or is connected with a lever arm 43 connected with the outer end of a short shaft 44 journaled in the plate 40 and an arm 45 forming part of the bracket 30, see Fig. 2. To the shaft 44 and located within the compartment 8, is connected a lever arm 46, see Fig. 11, to which is pivotally and link connected the upper end of a shiftable rod 47, which extends down alongside of the tubing or casing 29 and has a slidable bearing relation in the neck portion of the tubular portion 15 of the upper housing section 14, see Fig. 8, and protruding into the tubular portion 15 has connected therewith a plate member 48 which embraces and has a slidable movement up and down on the propeller shaft 23 and is secured or connected to the upper end of the key 28, see Figs. 8 and 10. At predetermined points on said rod 47, the rod is provided with annular recesses 49 which may be brought to coincide with a spring retained ball 50, which will permit the rod with its recesses to be moved up and down past the ball and yet be held in adjusted positions by the ball entering a recess at selected positions of said rod 47, adjusted to position by the lever arm 43, Fig. 1, when the speed of the propeller shaft has been determined upon or to retain the said rod in a neutral position and the transmission gearing disconnected from the propeller shaft, as it is believed will be understood.

The operative means, driving connections therewith and clutch control

The operative means comprises a power head, including the two sections 32 and 52; the former of vertical tubular formation having a bell-shaped base 53 from which depends a reduced tubular and axially disposed neck portion or extension 31, previously referred to. The lower end of this neck is preferably flanged, as at 54 and in its lowermost position, see Fig. 3, rests on the base portion of the bracket member 30 and secured in said flange 54 and depending therefrom are a plurality of centering pins 55 which are caused to register and enter sockets 56 in the base of the bracket member. The power head may be removed entirely from the table top by merely lifting the head from off the table, or the head may be lifted and rotated to adjusted positions, one of which is disclosed in dotted lines in Fig. 3, whereby to change the position of the take-off devices, to be more fully described. On the bell-shaped base 53 are a plurality of rests 57 of rubber or like material which will take up any jar incident to placing the power head in position. Interiorly of the upper end of the section 32 are bearing surfaces 58 against which bears the depending tubular extension 59 of the section 52 which has a telescopic relation with the section 32 to adapt the section 52 and particularly its extension 59 to be raised and lowered on the section 32. In the position of the sections 32 and 52, Fig. 3, they are both in their lowermost positions, one on the table and the other on its supporting section.

Referring to Figs. 3 and 6, reference will be made to the means which will permit an attendant to raise and lower the section 52 on the section 32 and make or break the clutch connection, to be described, through and by means of which power may be transmitted from the propeller shaft 23 to the power take-off devices associated with the section 52 of the power head. Such means comprises a link 60 pivotally connected at one end to the section 52 and to its free end is pivotally connected a lever 61, which in turn has a pivotal connection at 62 on the section 32. It should be obvious, therefore, that an attendant on depressing the outer end of the lever 61 may easily lift the section 52 on the section 32. Full and dotted line positions of the means just described are seen in Fig. 6. The extent of the lever and link movement, as well as the extent of the upward movement of the section 52 is limited by the engagement of the shouldered end 62 of the link 60 against a pin 63 on the lever 61. Guiding means between the two sections 52 and 53 comprise the pins 64 connected exteriorly to the section 52 and movable in guides 65 also arranged exteriorly on the section 32.

Disposed axially through the extension 59 of the section 52 and having suitable bearings for rotation therein and extending down through the bell shaped base of the section 32 and into the neck 31 is a shaft 66. On the lower end of said shaft is secured a clutch member 67 which has an extension 68 complementary to the socket 37 in the member 34, whereby to permit the clutching and de-clutching of the shaft 66 with the propeller shaft 23 on the raising and lowering of the section 52 on the section 32, in the manner and by the means previously described. The power head with its clutch member 67, when removed from and seated on the table, has a telescopic relation with the guiding tubing or casing 29, as it is believed will be understood.

*The power take-off devices and associated parts*

The section 52 of the power head is formed or provided with variously located and positioned bearings in which are adapted to be rotated certain power take-off shafts to each of which may be connected, at will, certain devices, as for instance, a slicer, juicer, beater, or the like. The position the power take-off device may be caused to assume is determined entirely by an attendant when he or she positions the power head on the table, as should be obvious from the foregoing description.

Arranged preferably horizontally in the section 52 and journaled in suitable bearings is a shaft 69 to the inner end of which is secured a bevel gear 70 while to its opposite end is secured a clutch member 71 preferably disposed within a cylindrical neck portion 72 of the section 52. On said shaft and near its outer end is secured a bevel gear 73 and said gear is in mesh with a bevel gear 74 on the upper end of the shaft 66. Disposed vertically in the section 52 and journaled in suitable bearings is a shaft 75 on which is secured a bevel gear 76 which meshes with the gear 70. The upper end of the shaft 75 is formed or provided with a clutch portion 77 located and operated within a preferably cylindrical neck portion 78 of the section 52. The section 52 is preferably chambered, as shown, closed by a cover plate 79 on which is formed or to which is connected the neck portion 78 and said cover plate, when removed, permits access to be had to the chambered portion of the section 52 and to the shafting and gearing described, therewithin.

To the lower end of the shaft 75 is preferably operatively connected a form of epicycle gear through and by means of which a take-off shaft 80 is operated. These last mentioned elements, including the shaft 80, comprise the pinion 81 formed on or connected to the upper end of said shaft 80 and said pinion meshes with and is rotated from an internal ring gear 82 connected to or constituting a part of a rotatable head 83 which, as shown, is connected to the lower end of the shaft 75.

For the purpose of illustration, but intended in no sense as limitations, I have shown removably and clutch connected to the outer end of the shaft 69, a slicer 84 of any desired or well known construction adapted for connection and use in connection with said take-off shaft 69. Also removably and clutch connected to the upper end of the take-off shaft 75 is a juicer 85 of any desired or well known construction adapted for connection with said take-off shaft 75. In this instance the juicer comprises a shelf 86 on which may be placed a glass or other receptacle to receive the discharge of juices from the juicer. Also there is shown removably connected to the lower end of the take-off shaft 80 a beater 87 of any desired or well known construction adapted for connection with said take-off shaft 80. Beaters, such as those shown, are usually employed with some sort of a bowl or like receptacle and in this instance I have provided a bowl 88 having connected thereto and exteriorly thereof a bracket 89. This bracket is adapted for a removable and pivotal connection, at 90, with an ear 91 on the section 32, see Fig. 5, to permit removal when desired and to be swung on its pivot to one side to allow for the placement and removal of the beater 87, the bowl being normally secured in position directly beneath the section 52 and the take-off shaft 80, as will be understood. To lock or secure the bowl in usable position, I have provided a bracket 89 with a catch 92 adapted for latching engagement with a spring held latch member 93 which is pivoted at 94 to the section 32, as shown.

*The adapter to permit the use of a laundry appliance, as for instance, an ironer*

Such an adapter and appliance are shown in full and dotted lines in Fig. 14.

The adapter comprises substantially a power head 95, including an operating shaft 96 formed or provided at its upper end with a clutch member 97. The head 95 is not unlike the section 32 of the power head previously described and the said head and its shaft 96 are adapted for attachment to the cabinet and removal therefrom in substantially the same manner as that previously described in connection with corresponding elements shown in Fig. 3, and the shaft 96 adapted to be operated from the propeller shaft 23.

The particular laundry appliance selected for disclosure in this instance is shown in dotted lines in Fig. 14 and comprises an ironer 98 which includes a bracket 99 enclosing driving parts, not shown, adapted for clutch connection with the shaft 96 and supported from the power head 95 and arranged for removable connection therewith. The ironer further includes a mandrel 100 and a support 101, allowing the mandrel to rest on the table top. A lever 102 would be included to enable an attendant to control the operation of the driving parts of the ironer from the shaft 96. The ironer shown is for illustrative purposes only and not in any sense intended as limiting the use to any particular construction of ironer.

It should be obvious from the foregoing that a power head may be used employing power take-off devices extending in different directions from the head and the head adjustable to permit positioning these devices at different points in relation to the cabinet table; also, that the head and its take-off devices may be removed and an adapter placed and used in lieu of or as a substitute therefor permitting the use of a laundry appliance, as for example, an ironer, or the heads removed entirely and the table of the cabinet used as would be used an ordinary table. Furthermore, the trays 10 and 11 may be used to hold any of the operative parts, used in connection with the power head, even the head itself, when such parts are removed from the table and not in use.

What I claim is:—

1. A service table for the purposes described comprising a cabinet having a table top, a changeable speed transmission located beneath the cabinet, an operative means arranged for attachment on the table top and having a plurality of power take-off devices projecting at different points and in different directions therefrom, operating connections between said transmission and said operative means, and means to effect a change of speed to said connections from said transmission.

2. A service table for the purposes described comprising a cabinet having a table top, a changeable speed transmission located beneath the cabinet, an operative means arranged for attachment on the table top and having a plurality of power take-off devices projecting at different points and in different directions therefrom, operating connections between said transmission and said operative means, means to clutch and declutch said operative means with said operating connections, and means to effect a change of speed to said connections from said transmission.

3. A service table for the purposes described comprising a cabinet having a table top, a changeable speed transmission, an operative means arranged for removable attachment on the table top and in adjusted positions thereon and having a plurality of power take-off devices projecting at different points and in different directions therefrom, operating connections between said transmission and said operative means, means to clutch and declutch said operative means with said operating connections, and means to effect a change of speed to said connections from said transmission.

4. A service table for the purposes described comprising a cabinet having a table top, a changeable speed transmission located beneath the cabinet, an operative means arranged for attachment on the table top and being provided with a plurality of power take-off devices, operating connections enclosed within the cabinet and adapted for operative connection with said transmission and said operative means, and means to effect a change of speed to said connections from said transmission.

5. A service table for the purposes described comprising a cabinet having a table top, a changeable speed transmission located beneath the cabinet, an operative means arranged for removable attachment on the table top and in adjusted positions thereon and having a plurality of power take-off devices projecting at different points and in different directions therefrom, operating connections enclosed within the cabinet and adapted for operative connection with said transmission and said operative means, means to clutch and declutch said operative means with said operating connections and means to effect a change of speed to said connections from said transmission.

6. A service table for the purposes described comprising a cabinet having a table top, a driving mechanism beneath the cabinet, an operative means arranged for attachment on the table top and being provided with a plurality of power take-off devices, a propeller shaft housed within the cabinet and adapted for operating connection with said mechanism and said operative means, means located within the cabinet to effect periodic driving connection between said shaft and said mechanism, and means exposed on the outside of the cabinet whereby to effect movement of said last mentioned means.

7. A service table for the purposes described comprising a cabinet having a table top, a driving mechanism beneath the cabinet, an operating means arranged for removable attachment on the table top and in adjusted positions thereon and having a plurality of power take-off devices projecting at different points and in different directions therefrom, a propeller shaft housed within the cabinet and adapted for operating connection with said mechanism and said operative means, means operative from outside the cabinet for clutching and declutching said operative means with said shaft, means located within the cabinet to effect periodic driving connection between said shaft and said mechanism, and means exposed on the outside of the cabinet whereby to effect movement of said last mentioned means.

8. A service table for the purposes described comprising a cabinet having a table top, a changeable speed transmission located beneath the cabinet, an operating means arranged for attachment on the table top and being provided with a plurality of power take-off devices, a propeller shaft housed within the cabinet and adapted for operating connection with said transmission and said operative means, means operative from outside the cabinet for clutching and declutching said operative means with said shaft, means located within the cabinet to effect a change of speed to said shaft from said transmission, and means exposed on the outside of the cabinet whereby to effect movement of said last mentioned means.

9. A service table for the purposes described comprising a cabinet having a table top, changeable speed transmission located beneath the cabinet, an operative means arranged for removable attachment on the table top and in adjusted positions thereon and having a plurality of power take-off devices projecting at different points and in different directions therefrom, a propeller shaft housed within the cabinet and adapted for operating connection with said transmission and said operative means, means operative from outside the cabinet for clutching and declutching said operative means with said shaft, means located within the cabinet to effect a change of speed to said shaft from said transmission, and means exposed on the outside of the cabinet whereby to effect movement of said last mentioned means.

10. A service table for the purposes described comprising a cabinet having a table top, a changeable speed mechanism located beneath the cabinet, an operative means arranged for attachment on the table top and being provided with a plurality of power take-off devices, a propeller shaft housed within the cabinet and adapted to receive power from the transmission and transmit power to the operative means, clutch means within the cabinet of effect clutching and declutching of the propeller shaft with said operative means, means located outside the cabinet to effect operation of the clutch means, means located within the cabinet to effect a change of speed to said shaft from said transmission, and means exposed on the outside of the cabinet whereby to effect movement of said speed changing means.

11. A service table for the purposes described comprising a cabinet having a table top, a changeable speed mechanism located beneath the cabinet, an operative means arranged for removable attachment on the table top and in adjusted positions thereon and having a plurality of power take-off devices projecting at different points and in different directions therefrom, a propeller shaft housed within the cabinet and adapted to receive power from the transmission and transmit power to the operative means, clutch means within the cabinet to effect clutching and declutching of the propeller shaft with said operative means, means located outside the cabinet to effect operation of the clutch means, means located within the cabinet to effect a change of speed to said shaft from said transmission, and means exposed on the outside of the cabinet whereby to effect movement of said speed changing means.

12. A service table for the purpose described comprising a cabinet having a table top, a motor supported below the cabinet, a transmission mechanism housed below the cabinet and connected with said motor, an operating means located within the cabinet, an operative means arranged for securement on the table top, means to effect a periodic driving connection between said operating means and said operative means, and means to effect a periodic driving connection between said operating means and said mechanism.

13. A service table for the purposes described comprising a cabinet having a table top, a motor supported below the cabinet, a changeable speed transmission housed below the cabinet and operatively connected with said motor, a power head arranged for attachment to and removal from the table top and having a plurality of power take-off devices, operating means within the cabinet adapted for connection with said transmission and with said power take-off devices, means to effect a clutching and declutching connection between said operating means and said power take-off devices, and means to effect a driving connection between said operating means and said transmission.

14. A service table for the purposes described comprising a cabinet, a propeller shaft housed within the cabinet and having an end arranged for connection therewith of power take-off devices, a changeable speed mechanism located below the cabinet, operating means within the cabinet adapted when actuated to effect a driving or non-driving connection between said shaft and said transmission, and lever means on the outside of the cabinet and in operative connection with said operating means whereby to effect movement of said operating means.

15. A service table for the purposes described comprising a cabinet, a propeller shaft disposed vertically within the cabinet and having its upper end arranged for connection therewith of power take-off devices, changeable speed gearing housed beneath the cabinet, a train of gears loose on the propeller shaft and having a meshing relation, respectively, with certain of the changeable speed gearing, means movable to effect the clutching, one at a time, of the gears on the propeller shaft, to said shaft, and lever means on the outside of the cabinet and in operative connection with said clutch means to effect movement of the latter.

16. A service table for the purposes described comprising a cabinet, a propeller shaft disposed vertically within the cabinet and provided with a clutch member at its upper end, gearing housed beneath the cabinet, an actuating means located exteriorly of the cabinet arranged for effecting operative connection between said shaft and said gearing, a power head adapted for removable connection with said cabinet, a driving shaft in said head having a clutch member adapted for clutch connection with the clutch on said propeller shaft, and means to control the clutch connection between said driving and propeller shafts.

17. A service table for the purposes described comprising a cabinet, a propeller shaft disposed vertically within the cabinet and provided with a clutch member at its upper end, gearing housed beneath the cabinet, an actuating means located exteriorly of the cabinet arranged for effecting operative connection between said shaft and said gearing, a power head adapted for removable connection with said cabinet, and a driving shaft in said head having a clutch member adapted for automatic clutch connection with the clutch on the propeller shaft simultaneously with the placement of the power head on the cabinet.

18. A service table for the purposes described comprising a cabinet, a propeller shaft disposed vertically within the cabinet and provided with a clutch member at its upper end, gearing housed beneath the cabinet, an actuating means located exteriorly of the cabinet arranged for effecting operative connection between said shaft and said gearing, a power head adapted for removable connection with said cabinet, a driving shaft in said head having a clutch member adapted for automatic clutch connection with the clutch on the propeller shaft simultaneously with the placement of the power head on the cabinet, a plurality of power take-off devices on said head in operative connection with said driving shaft, and means to control the operation of said power take-off devices.

19. A service table for the purposes described comprising a cabinet, a propeller shaft disposed vertically within the cabinet, means to actuate said shaft, a lever means exposed on the outside of the cabinet to control said actuating means, a power head arranged for attachment in a vertical position on the cabinet in alignment with said propeller shaft, a driving shaft within said head, and means providing an operating connection between said propeller and driving shafts.

20. A service table for the purposes described comprising a cabinet, a propeller shaft disposed vertically within the cabinet and having a driving part on its upper end, means to actuate said shaft, a lever means exposed on the outside of the cabinet to control said actuating means, a power head arranged for attachment in a vertical position on the cabinet in alignment with said propeller shaft, said head comprising two sections, a lower and an upper section, a lever means to raise and lower said upper section, a driving shaft having journal bearings in both said sections and axially movable with the movement of the upper section, a driving part on said driving shaft adapted for operative connection with said propeller shaft, and power take-off devices associated with said upper section and operatively connected with said driving shaft.

21. In a service table, in combination, a cabinet constructed with a table top and divided compartments, slidable trays in one compartment, a roller closure for said tray compartment, a propeller shaft disposed vertically in one compartment, mechanism below the cabinet arranged for operative connection with said shaft, a lever means on the outside of the cabinet arranged to control the connections between said shaft and said mechanism, a power head arranged for placement on said table top, operating means associated with said head, and means for actuating said operating means from said propeller shaft.

22. In a service table, in combination, a cabinet divided into compartments and having a table top, slidable trays in one compartment, a roller closure for said tray compartment, a propeller shaft disposed vertically in the other compartment, a tubular casing about said shaft, gearing housed beneath said cabinet, means to connect the shaft with said gearing, lever means on the outside of the cabinet arranged to control the position of said connecting means, and means on the upper end of said shaft arranged for driving connection with an operating means positioned on the table top.

23. In a service table, in combination, a cabinet having a table top provided with an opening for the insertion of an operating means, a driving shaft disposed vertically within the cabinet and in alignment with said opening and provided on its upper end with a driving part, mechanism located below the cabinet arranged for operative connection with the lower end of said shaft, means in the cabinet adapted to operatively connect said shaft with said mechanism, and means operative on the outside of said cabinet and controlling said connecting means between the shaft and said mechanism.

24. In a service table, in combination, a cabinet having a table top provided with an opening for the insertion of an operating means, a vertically disposed shaft within the cabinet in alignment with said opening, means to operate said shaft from beneath the cabinet, a lever means on the outside of the cabinet controlling the connection of the operating means with said shaft, a two part power head seatable on the table top above its opening, one such part having a plurality of power take-off means associated therewith, a driving shaft operative in both said parts and bodily movable with the part having the power take-off means, means to clutch connect said driving shaft with said vertical shaft, and a lever means to move that part of the head having said power take-off and with it the driving shaft to declutch it from said vertical shaft.

25. In a service table, in combination, a cabinet having a table top provided with an opening, a driving means located within the cabinet in line with said opening, means to actuate said driving means, means to control operative connection between said actuating means and said driving means, a removable and adjustable power head arranged for support on the table top above said opening, said head comprising two sections, one movable on the other, power take-off devices in the movable section, a driving shaft journaled within the head and operatively connected with said take-off devices, means on said driving shaft arranged for operative connection with said driving means, and means to move the power take-off section in its relation to the other section and with it the driving shaft whereby to break the driving connection there between and said driving means.

26. In a service table, in combination, a cabinet having a table top provided with an opening into the cabinet, a tubular casing disposed vertically in the cabinet in axial alinement with the opening in the table top, a propeller shaft disposed within said casing and terminating short of the table top, a driving part on the upper end of said shaft, a transmission below the cabinet arranged to operate said propeller shaft, a power head arranged for attachment to said table top and provided with a part for insertion through the opening in the table top, a plurality of power take-off devices in said head, and an operating means for said take-off devices within said head having means complementary to said driving part on the propeller shaft whereby to receive power from said shaft.

27. In a service table, in combination, a cabinet having a table top provided with an opening into the cabinet, a tubular casing disposed vertically in the cabinet in axial alinement with the opening in the table top, a propeller shaft disposed within said casing and terminating short of the table top, a driving part on the upper end of said shaft, a transmission below the cabinet arranged to operate said propeller shaft, a power head arranged for attachment to said table top and provided with a part for insertion through the opening in the table top, a plurality of power take-off devices in said head, an operating shaft in said head geared to said take-off devices and arranged for insertion through the opening in said table top when the head is in attached position on said table, a driving part on said operating shaft complementary to the driving part on said propeller shaft, means to manually control the connection between said driving parts, and means to manually control the driving connection between said propeller shaft and said transmission.

28. In a service table, in combination, a cabinet having a table top provided with an opening into the cabinet, a propeller shaft disposed vertically within the cabinet in axial alinement with said opening, its upper end terminating short of the table top and provided thereon with a connectible driving part arranged for detachable connection therewith of a power means insertable through said opening, a transmission supported beneath the cabinet, a motor also supported beneath the cabinet in operative connection with said transmission, means to operatively connect the transmission with the lower end of said shaft, and manually operable means on the outside of the cabinet for controlling said connecting means.

29. In a service table, in combination, a cabinet having a table top provided with an opening into the cabinet, a propeller shaft disposed vertically within the cabinet in axial alinement with said opening, its upper end terminating short of the table top and provided thereon with a connectible driving part arranged for detachable connection therewith of a power means insertable through said opening, a changeable speed transmission housed beneath the cabinet, a motor beneath the cabinet operatively connected with such transmission, a train of gears loosely carried on the lower end of said shaft and meshing with certain of the gears of the transmission, a shiftable means arranged for connecting either of the train of gears with said shaft and to be moved to a neutral position with respect to the gears of said train of gears, and manually operable means on the outside of the cabinet in operative connection with said shiftable means.

30. In a service table, in combination, a cabinet having a table top provided with an opening into the cabinet, a propeller shaft disposed vertically within the cabinet in axial alinement with said opening, its upper end terminating short of the table top and provided thereon with a connectible driving part arranged for detachable connection therewith of a power means insertable through said opening, a changeable speed transmission housed beneath the cabinet, a motor beneath the cabinet operatively connected with such transmission, a train of gears loosely carried on the lower end of said shaft and meshing with certain of the gears of said transmission, means shiftable longitudinally of said shaft and within the gears thereon for individually connecting each of said gears with said shaft and to be moved to a neutral position with respect to each of said gears, an operating means for said shiftable means extending to a point outside of said cabinet, and a hand lever means on the outside of the cabinet arranged for actuating said operating means.

31. In a service table, in combination, a cabinet having a table top provided with an opening into the cabinet, a chambered bracket supported from the top within the cabinet and provided with positioning means for a power head, a vertically disposed propeller shaft within the cabinet and terminating at its upper end in said bracket, means for operating said shaft, a driving part on the upper end of said shaft, a power head adapted for detachable and adjustable connection on the table top and arranged for connection with said positioning means, power take-off devices in said head, a driving shaft for said take-off devices and having a driven part arranged for connection with the driving part of the propeller shaft, and means for effecting axial movement of said driving shaft to connect and disconnect it from the propeller shaft.

32. In a service table, a cabinet having a table top provided with an opening into the cabinet, a vertically disposed propeller shaft in the cabinet in line with said opening, means to operate the propeller shaft, a power head arranged for detachable and adjustable connection with said table top, means to hold the head in different adjusted positions on the table top, said head comprising lower and upper sections, the latter arranged for an up and down movement on said lower section, a driving shaft having a journal relation with the upper section of the head and adapted for clutch connection at its lower end with the upper end of the propeller shaft, power take-off devices associated with the upper section of the head and in driving relation with said driving shaft, and means to effect movement of the upper section of the head in its lower section and thereby control the clutch connection between the driving and propeller shafts.

33. In a service table, a cabinet having a table top provided with an opening into the cabinet, a vertically disposed propeller shaft in the cabinet in line with said opening, means to operate the propeller shaft, a power head arranged for detachable and adjustable connection with said table top, means to hold the head in different adjusted positions on the table top, said head comprising lower and upper sections, the latter arranged for an up and down movement on said lower section, a driving shaft having a journal relation with the upper section of the head and adapted for clutch connection at its lower end with the upper end of the propeller shaft, power take-off devices associated with the upper section of the head and in driving relation with said driving shaft, and a lever means having a pivotal connection on the lower section of the head and in operative connection with the upper section of the head whereby to raise and lower said upper section and thereby control the clutch connection between the driving and propeller shafts.

34. In a service table, in combination, a cabinet, a vertically disposed propeller shaft arranged within the cabinet and having a driving part on its upper end with which is adapted to have connection, a power take-off means, the lower end of said shaft having an elongated key-way therein, a driving shaft disposed in spaced relation to the lower end of the propeller shaft and having secured thereon a train of gears in superimposed relation and of different diameters, a motor geared to one of the gears on said driving shaft, a train of gears loosely carried on the lower end of the propeller shaft and of different diameters, each having a meshing relation with one of the gears on the driving shaft, a key slidably arranged in the key-way of the propellor shaft and adapted for connecting the respective gears to the propeller shaft or to be moved into neutral relation therewith, means reciprocally disposed within the cabinet and adapted to move said key and to retain it in different positions on the propeller shaft, and a lever means arranged on the outside of the cabinet and in operative connection with said reciprocal means.

35. In a service table, in combination, a cabinet, a shallow gear casing disposed beneath the cabinet, a vertically disposed propeller shaft arranged within the cabinet and having a driving part of its upper end with which a power take-off means is adapted to have connection, the lower end of said shaft projecting through the bottom of the cabinet and journaled in said gear casing and that portion of said propeller shaft projected below the casing having a key-way therein, a driving shaft journaled in the casing in spaced relation to the lower end of the propeller shaft and having secured thereon, a train of gears in superimposed relation and of different diameters, a motor geared to one of the gears on said driving shaft, a train of gears loosely carried on the lower end of the propeller shaft and of different diameters, each having a meshing relation with one of the gears on the driving shaft, a key slidably arranged in the key-way of the propeller shaft and adapted for connecting the respective gears to the propeller shaft or to be moved into neutral relation therewith, means reciprocally disposed within the cabinet and adapted to move said key and to retain it in different positions on the propeller shaft, and a lever means arranged on the outside of the cabinet and in operative connection with said reciprocal means.

In witness whereof, I have hereunto affixed my hand and seal this 23rd day of October, 1930.

ALPHEUS W. ALTORFER.